United States Patent
Li et al.

(10) Patent No.: US 11,233,335 B2
(45) Date of Patent: Jan. 25, 2022

(54) OMNIDIRECTIONAL ARRAY ANTENNA AND BEAMFORMING METHOD THEREFOR

(71) Applicant: TONGYU COMMUNICATION INC., Zhongshan (CN)

(72) Inventors: Daotie Li, Zhongshan (CN); Zhonglin Wu, Zhongshan (CN); Mulin Liu, Zhongshan (CN)

(73) Assignee: TONGYU COMMUNICATION INC., Zhongshan (CN)

( * ) Notice: Subject to any disclaimer, the term of this patent is extended or adjusted under 35 U.S.C. 154(b) by 0 days.

(21) Appl. No.: 16/651,505

(22) PCT Filed: Nov. 27, 2017

(86) PCT No.: PCT/CN2017/113091
§ 371 (c)(1),
(2) Date: Mar. 27, 2020

(87) PCT Pub. No.: WO2019/100376
PCT Pub. Date: May 31, 2019

(65) Prior Publication Data
US 2020/0303831 A1     Sep. 24, 2020

(51) Int. Cl.
| | |
|---|---|
| *H01Q 21/00* | (2006.01) |
| *H01Q 1/38* | (2006.01) |
| *H01Q 25/04* | (2006.01) |
| *H04B 7/0452* | (2017.01) |
| *H04W 16/28* | (2009.01) |

(52) U.S. Cl.
CPC ........... *H01Q 21/0025* (2013.01); *H01Q 1/38* (2013.01); *H01Q 25/04* (2013.01); *H04B 7/0452* (2013.01); *H04W 16/28* (2013.01)

(58) Field of Classification Search
CPC ....... H04B 7/0413; H04B 7/0452; H01P 3/06; H01P 5/085; H01Q 1/246; H01Q 1/405; H01Q 1/42; H01Q 21/0025; H01Q 21/0068; H01Q 21/00; H01Q 21/205; H04J 14/02
See application file for complete search history.

(56) References Cited

U.S. PATENT DOCUMENTS

| | | | | |
|---|---|---|---|---|
| 6,795,018 | B2 * | 9/2004 | Guo ...................... | H01Q 1/246 342/372 |
| 2015/0364831 | A1 * | 12/2015 | Li ......................... | H01Q 21/08 343/816 |
| 2018/0031689 | A1 * | 2/2018 | Ben-Ari .............. | G01S 13/4454 |
| 2018/0367199 | A1 * | 12/2018 | Zimmerman ........ | H01Q 25/001 |

* cited by examiner

*Primary Examiner* — Tu X Nguyen
(74) *Attorney, Agent, or Firm* — Oliff PLC (57) ABSTRACT

An omnidirectional array antenna includes N omnidirectional subarray units circumferentially arranged to form a circular array, where each of the omnidirectional subarray units includes p coaxially-arrayed symmetrical oscillators, and N and p are both natural numbers. The omnidirectional array antenna beamforming method includes various omnidirectional subarray units stimulated by equiamplitude, in-phase or out-phase stimulation, thereby forming different types of transaction beams, such as an omnidirectional beam, a double-beam, a triple-beam, and a quadruple-beam.

17 Claims, 7 Drawing Sheets

OMNIDIRECTIONAL ARRAY ANTENNA AND BEAMFORMING METHOD THEREFOR

BACKGROUND

Technical Field

The present invention relates to the field of communications, and in particular, to a MIMO omnidirectional array antenna beamforming method and technology suitable for 5G applications.

Related Art

In engineering, simpler things are more useful. An omnidirectional antenna is the most primitive, simplest, and the most useful type in an antenna family. First, horizontally omnidirectional radiation is the most significant characteristic that is of the omnidirectional antenna and is exactly most required by wireless communication. In a wireless communication system, because mutual positions of a transmitting station and a receiving apparatus are not fixed, both the transmitting station and the receiving apparatus are required to install the omnidirectional antenna to ensure that a link is unblocked when they are in any position relationship. Next, the omnidirectional antenna has natural advantages such as miniaturization and low costs, and is easy to install, easy to deploy, and visually concealed. In contrast, when a directional antenna is used for horizontally omnidirectional coverage, multiple co-circumferential arrangement and sectorized methods are required to implement the horizontally omnidirectional coverage. Because of a large number of antennas, a large size, a heavy weight, and high installation requirements, construction costs of a site are high, and user's visual sense is poor. The foregoing advantages enable the omnidirectional antenna to become a classic antenna in the field of wireless communications, and the omnidirectional antenna has been widely applied to the fields of short wave communication, cellular communication, traffic police affairs, national defense and military, aerospace, marine exploration, and amateur radio, etc. Under stimulation of continuous and strong demands of wireless services, a great number of innovative researches are made on the omnidirectional antenna, performance of the omnidirectional antenna is continuously improved and enhanced, and an application field of the omnidirectional antenna is further expanded. It can be predicted that the omnidirectional antenna will renew their vitality and keep yielding brilliant results in the future wireless system.

In the 5G era, a cellular system can achieve a high capacity, a high data rate, high reliability, low latency, and low power consumption, etc. In order to increase a system capacity, massive MIMO (mMIMO) technologies will be widely used, so that data transmission rate is increased by tens or hundreds of times. At present, an mMIMO antenna is developed mainly on a large-scale macro base station scenario. Due to high capacity requirements, large coverage, and multiple coverage modes, an antenna array scale of such base stations is usually large, such as 128 units or 256 units, and operating frequency bands are low frequencies such as 2.6 G, 3.5 G, and 4.5 G. Obviously, like a traditional macro station antenna, the antenna of the mMIMO array has problems such as a large size, a heavy weight, a site selection difficulty, installation difficulty, and higher costs. The higher costs can be offset by increased profits brought by increasing the capacity. However, in addition to high-capacity and multi-mode scenarios, there are still many low-capacity and less-mode application scenarios in 5G. In this case, there is an urgent need for a low-order MIMO antenna with a relatively small array size but greatly reduced size, weight, and costs, such as 8 units or 16 units. In this case, the advantages of miniaturization and low costs enables the omnidirectional antenna to become the most attractive mMIMO solution. However, during beamforming implementation, the omnidirectional antenna will encounter challenges such as a low gain, few formed beams, a complex algorithm, strong array element coupling, and little experience for reference.

Technical Problems

At present, an antenna in this field has technical problems such as a large size, a heavy weight, a site selection difficulty, an installation difficulty, higher costs, a low gain, fewer formed beams, and a complex algorithm, etc.

Technical Solutions

The present invention is intended to provide an omnidirectional array antenna beamforming method with a high gain, multiple formed beams, and a simple algorithm and an omnidirectional array antenna.

In order to achieve the objective of the present invention, the following technical solutions are provided.

An omnidirectional array antenna is provided in the present invention, including an antenna array consisting of N omnidirectional subarray units arranged circumferentially, a diameter of the circular array being an integral multiple (that is, $D=2R=m\lambda_c$, where m is a natural number) of a central wavelength $\lambda_c$, each of the omnidirectional subarray units includes p coaxially-arrayed symmetrical oscillators, and N and p being both natural numbers.

Preferably, the coaxially-arrayed symmetric oscillators of the omnidirectional subarray units are half-wave oscillators, and may also include half-wave oscillators or oscillators of other wavelengths.

Preferably, the symmetric oscillators of the omnidirectional subarray units are coaxially arrayed into a vertically polarized subarray or coplanarly arrayed into a horizontally polarized subarray.

Preferably, the N omnidirectional subarray units are vertically arranged at equal intervals, and a circumferential azimuth angle $\varphi_n = 2 \cdot n \cdot \pi / N$, where $n = 1, 2, 3, \ldots, N$.

Preferably, the symmetric oscillators of the omnidirectional subarray units are printed on a PCB dielectric plate, the dielectric plate being perpendicular to a diameter of the circular array. In some other implementations, the symmetrical oscillators of the omnidirectional subarray units may also be constructed in a form of a metal tube.

The present invention also provides an omnidirectional array antenna beamforming method, which is applied to the foregoing omnidirectional array antenna, and various omnidirectional subarray units are stimulated by means of equiamplitude ($I_n=1$; $n=1, 2, 3, \ldots, N$), in-phase or out-phase stimulation, thereby forming different types of beams.

Preferably, the different types of beams include at least any of a single omnidirectional beam, a single directional beam, a directional narrow double-beam, a directional wide double-beam, a non-collinear directional double-beam, a directional unequal-width double-beam, a directional triple-beam, and a directional quadruple-beam.

Preferably, a forming algorithm of the single omnidirectional beam is stimulating various omnidirectional subarray units by means of equiamplitude, and a phase satisfies the following: four odd-numbered array elements are of a same phase, that is, $\beta_1=\beta_3=\beta_5=\beta_7$; four even-numbered array elements are of a same phase, that is, $\beta_2=\beta_4=\beta_6=\beta_8$; and the two sets of phases respectively satisfy relations: $\beta_1=\beta_2+\Delta\beta$, $\Delta\beta\in[0,\pi/2]$.

Preferably, a forming algorithm of the single directional beam is stimulating various omnidirectional subarray units by means of equiamplitude, and a phase satisfies the following:

$$\beta_n = \pm 2 \cdot i \cdot \pi - k \cdot R \cdot \sin\theta_m \cdot \cos\left(\varphi_m - \frac{2n\pi}{N}\right)$$

in the relation, i is an integer, n=1, 2, 3, ..., N; $k=2\pi/\lambda$, is a number of waves in the air, and $\theta_m$ and $\varphi_m$ are respectively an elevation angle $\theta_m$ and an azimuth angle $\varphi_m$ pointed by a maximum beam.

Preferably, a forming algorithm of a directional narrow double-beam is stimulating various omnidirectional subarray units by means of equiamplitude, and a phase satisfies the following relations: $\beta_1=\beta_4=(1/1.75+2\cdot q)\cdot\pi$, $\beta_2=\beta_3=2\cdot q\cdot\pi$, $\beta_5=\beta_8=[(1/1.75)+2\cdot q]\cdot\pi$, and $\beta_6=\beta_7=(1+2\cdot q)\cdot\pi$, where q is an integer.

Preferably, a forming algorithm of the directional wide double-beam is stimulating various array elements by means of equiamplitude, and a phase satisfies the following relations: $\beta_1=\beta_2=\beta_3=\beta_4=2\cdot q\cdot\pi$, and $\beta_5=\beta_6=\beta_7=\beta_8=(1+2\cdot q)\cdot\pi$, where q is an integer.

Preferably, a forming algorithm of the directional unequal-width double-beam is stimulating various array elements by means of equiamplitude, and a phase satisfies the following relations: $\beta_1=\beta_3=\{[1-\cos(\pi/4)]+2\cdot q\}\cdot\pi$, $\beta_2=2\cdot q\cdot\pi$, $\beta_4=\beta_8=\pi$, $\beta_5=\beta_7=[(1-1/4)+2\cdot q]\cdot\pi$, and $\beta_6=[(1-1/6)+2\cdot q]\cdot\pi$, where q is an integer.

Preferably, a forming algorithm of the non-collinear directional double-beam is stimulating various array elements by means of equiamplitude, and a phase satisfies the following relations: $\beta_1=\beta_3=(1/1.75+2\cdot q)\cdot\pi$, $\beta_2=2\cdot q\cdot\pi$, $\beta_4=(1/1.75+1/2+2\cdot q)\cdot\pi$, $\beta_5=[(1+1/1.75+1/2)+2\cdot q]\cdot\pi$, $\beta_7=\pi$, and $\beta_6\beta_8=[(1+1/1.75)+2\cdot q]\cdot\pi$, where q is an integer.

Preferably, a forming algorithm of the directional triple-beam is stimulating various array elements by means of equiamplitude, and a phase satisfies the following relations: $\beta_1=\beta_3\{[1-\cos(\pi/4)]+2\cdot q\}\cdot\pi$, $\beta_2=2\cdot q\cdot\pi$, $\beta_4=\beta_8=(1+2\cdot q)\cdot\pi$, $\beta_5=[(1+1/3.5)+2\cdot q]\cdot\pi$, $\beta_6=[(1+1/2.875)+2\cdot q]\cdot\pi$, and $\beta_7=[(1-1/3.5)+2\cdot q]\cdot\pi$, where q is an integer.

Preferably, a forming algorithm of the directional quadruple-beam is stimulating various array elements by means of equiamplitude, and a phase satisfies the following relations: $\beta_1=\beta_4=\beta_5=\beta_8=2\cdot q\cdot\pi$ and $\beta_2=\beta_3=\beta_6=\beta_7=(1+2\cdot q)\cdot\pi$, where q is an integer.

In comparison to the prior art, the present invention has the following advantages.

According to the omnidirectional array antenna beamforming method proposed in the present invention, N array elements are used, the array elements being composed of meta-symmetric oscillator subarrays. The following beamforming algorithms are uniquely used to achieve different types of transaction beams and achieve various MIMO beamforming capabilities with a high gain, multiple formed beams, a simple algorithm, and low array element coupling. In addition, the omnidirectional array antenna exhibits huge potential in 5G applications. In addition, the method also has the characteristics of novel thinking, a clear principle, method universality, simplicity and practicability, etc., and is also effective and applicable to the provision of a beamforming design for an H/V single-polarized omnidirectional array antenna or an H/V dual-polarized omnidirectional antenna.

In some implementations, the different types of beams are formed as below. For example, (1) an omnidirectional beam is formed through stimulation by means of equiamplitude and in-phase stimulation to cover a horizontal periphery; (2) a horizontally directional beam is formed through stimulation by means of equiamplitude and out-phase stimulation to point to an azimuth angle; (3) a horizontally directional narrow double-beam is formed through stimulation by means of equiamplitude and out-phase stimulation, the two beams being collinear and having equal widths; (4) a horizontally directional wide double-beam is formed through stimulation by means of equiamplitude and out-phase stimulation, the two beams being collinear and having equal widths; (5) a horizontally directional unequal-width double-beam is formed through stimulation by means of equiamplitude and out-phase stimulation, the two beams being collinear and having unequal widths; (6) a horizontally directional narrow double-beam is formed through stimulation by means of equiamplitude and out-phase stimulation, the two beams having equal widths and being not collinear; (7) a horizontally directional triple-beam is formed through stimulation by means of equiamplitude and out-phase stimulation, the three beams having unequal widths and unequal included angles; (8) a horizontally directional narrow quadruple-beam is formed through stimulation by means of equiamplitude and out-phase stimulation, the four beams having equal widths and equal included angles. The foregoing different beams are the most typical and most useful types in future 5G applications.

Beneficial Effects

According to the omnidirectional array antenna beamforming method proposed in the present invention, N array elements are used, the array elements being composed of p meta-symmetric oscillator subarrays. The following beamforming algorithms are uniquely used to achieve different types of transaction beams and achieve various MIMO beamforming capabilities with a high gain, multiple formed beams, a simple algorithm, and low array element coupling. In addition, the omnidirectional array antenna exhibits huge potential in 5G applications. In addition, the method also has the characteristics of novel thinking, a clear principle, method universality, simplicity and practicability, etc., and is also effective and applicable to the provision of a beamforming design for an H/V single-polarized omnidirectional array antenna or an H/V dual-polarized omnidirectional antenna.

In some implementations, the different types of beams are formed as below. For example, (1) an omnidirectional beam is formed through stimulation by means of equiamplitude and in-phase stimulation to cover a horizontal periphery; (2) a horizontally directional beam is formed through stimulation by means of equiamplitude and out-phase stimulation to point to an azimuth angle; (3) a horizontally directional narrow double-beam is formed through stimulation by means of equiamplitude and out-phase stimulation, the two beams being collinear and having equal widths; (4) a horizontally directional wide double-beam is formed through stimulation by means of equiamplitude and out-phase stimulation, the two beams being collinear and having equal widths; (5) a horizontally directional unequal-width double-beam is formed through stimulation by means of equiamplitude and out-phase stimulation, the two beams being collinear and having unequal widths; (6) a horizontally directional narrow double-beam is formed through stimulation by means of equiamplitude and out-phase stimulation, the two beams having equal widths and being not collinear; (7) a horizontally directional triple-beam is formed through stimulation by means of equiamplitude and out-phase stimulation, the three beams having unequal widths and unequal included angles; (8) a horizontally directional narrow quadruple-beam is formed through stimulation by means of equiamplitude and out-phase stimulation, the four beams having equal widths and equal included angles. The foregoing different beams are the most typical and most useful types in future 5G applications.

In the present invention, an eight-unit beamforming omnidirectional antenna is designed for the future 5G applications, and 8 subarray units are evenly arranged on a circumference with a diameter of a central wavelength ($1\lambda_c$). Through a special beamforming algorithm, the array is covered by a single omnidirectional beam, a single directional beam, an equal-width or unequal-width double-beam, a collinear or non-collinear double-beam, a triple-beam and a quadruple-beam in an azimuth plane, which basically meets requirements for beams in multiple business modes. This enables the omnidirectional forming array to become an extremely potential antenna solution for the future 5G applications. In addition, the method also has the characteristics of novel thinking, a clear principle, method universality, simplicity and practicability, etc., and is also effective and applicable to a beamforming design for an H/V single-polarized omnidirectional antenna or an H/V dual-polarized omnidirectional antenna.

BRIEF DESCRIPTION OF THE DRAWINGS

The accompanying drawings are included to provide a further description and understanding of the present invention, and constitute a part of this specification. The accompanying drawings together with specific embodiments of the present invention are intended to explain the present invention, but do not constitute any limitation or restriction on the present invention.

DETAILED DESCRIPTION

The following provides preferred embodiments of the present invention with reference to the accompanying drawings, to describe the technical solutions of the present invention in detail.

Herein, two characteristics of ultra wideband and a high gain are emphasized to describe the present invention, and corresponding accompanying drawings are provided to describe the present invention in detail. It should be especially noted that preferred embodiments described herein are only used to describe and explain the present invention and are not used to limit or define the present invention.

The present invention is intended to provide a design solution of beamforming omnidirectional array antenna for future 5G applications, and to provide an effective reference method for a beamforming design of an H/V single-polarized omnidirectional array antenna or an H/V dual-polarized omnidirectional antenna.

Figure 1:
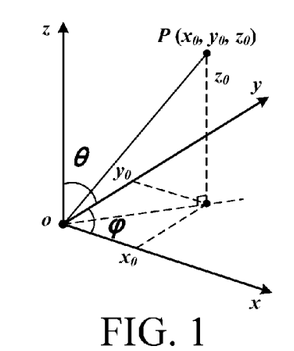
FIG. 1 is a schematic diagram of a definition of a rectangular coordinate system used in an antenna model according to the present invention.
Figure 2:
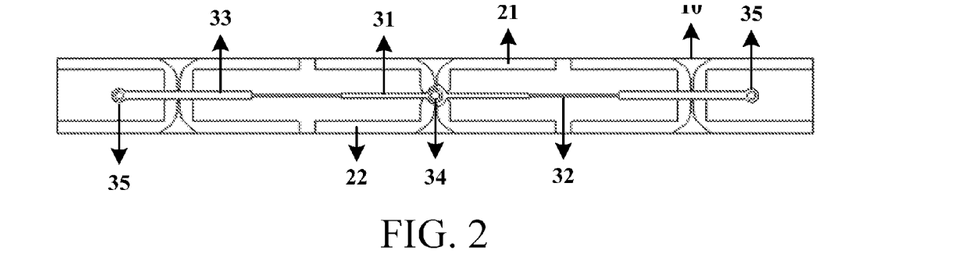
FIG. 2 is a front view of an omnidirectional subarray unit of an omnidirectional array antenna according to the present invention.

Referring to FIGS. 1-4, a method for constructing the omnidirectional array antenna according to the present invention is shown as follows:

Step I: A spatial rectangle coordinate system is established as shown in FIG. 1.

Step II: An omnidirectional subarray unit is constructed: a three-unit omnidirectional subarray unit is constructed in a YOZ plane, including a dielectric plate 10, two symmetric arms 21 and 22, a central feeding point 34, and a short-circuit point 35 at both ends, the central feeding point 34 being provided with a bonding pad and a non-metallized via hole, the short-circuit point 35 being provided with a metallized via hole and being printed with parallel two-conductor feeding lines 31, 32, and 33, and all portions being shown in FIG. 2.

Figure 3:
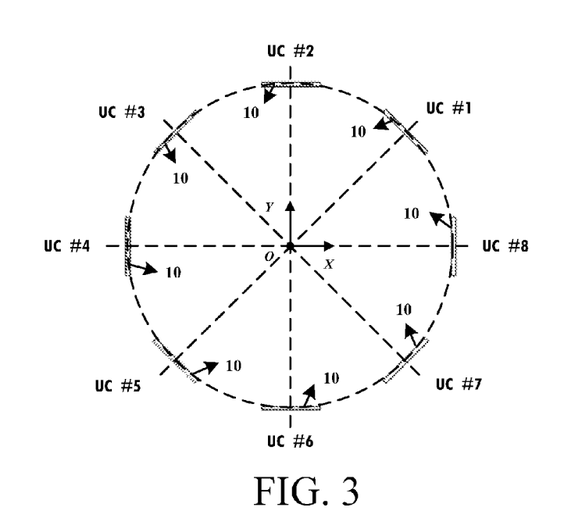
FIG. 3 is a top view of an omnidirectional array antenna model according to the present invention.
Figure 4:
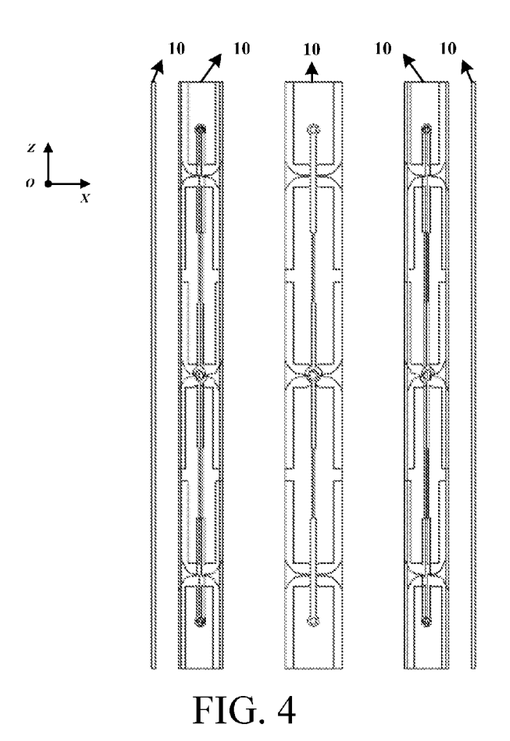
FIG. 4 is a front view of an omnidirectional array antenna model according to the present invention

Step III: Eight omnidirectional subarray units form a circular array, and the three-unit omnidirectional subarray unit in step II is rotated and replicated for eight times along an axis z, to form an eight-unit array evenly arranged along a circle with a diameter D=$1\lambda_c$, and a circumferential diameter is perpendicular to a PCB dielectric plate 10 of various omnidirectional subarray units; various subarrays are numbered UC #1-UC #8 (UC, Unit Cell), respectively located at azimuth angles of φ=45°, 90°, 135°, 180°, 225°, 270°, 325°, and 360°, as shown in FIG. 3 and FIG. 4.

Step IV: An array beam is formed by means of equiamplitude and in-phase or out-phase feeding form eight types of beams, as shown in FIGS. 7-14.

The omnidirectional array antenna obtained according to the foregoing construction method includes an antenna array consisting of N omnidirectional subarray units arranged circumferentially, a diameter of the circular array being an integral multiple (that is, $D=2 \cdot R=m \cdot \lambda_c$, m being a natural number) of a central wavelength $\lambda_c$, and each of the omnidirectional subarray units including p coaxially-arrayed symmetrical oscillators, and N and p being both natural numbers. In this embodiment, N is 8, and p is 3.

The coaxially-arrayed symmetric oscillators of the omnidirectional subarray units are half-wave oscillators, or may include half-wave oscillators or oscillators of other wavelengths.

The symmetric oscillators of the omnidirectional subarray units are coaxially arrayed into a vertically polarized subarray or coplanarly arrayed into a horizontally polarized subarray.

The N omnidirectional subarray units are vertically arranged at equal intervals, and a circumferential azimuth angle $\varphi_n=2 \cdot n \cdot \pi/N$, where n=1, 2, 3, . . . , N.

The symmetric oscillators of the omnidirectional subarray units are printed on a PCB dielectric plate, the dielectric plate being perpendicular to a diameter of the circular array. In some other implementations, the symmetrical oscillators of the omnidirectional subarray units may also be constructed in a form of a metal tube.

N array elements are arranged into a uniform circular array (N≥1, N being a natural number), a spacing angle between adjacent array elements is $\Delta\varphi=2 \cdot \pi/N$, a diameter of the circular array is an integral multiple (that is, $D=2 \cdot R=m \cdot \lambda_c$, m being a natural number) of the central wavelength $\lambda_c$. In this embodiment, a number $N=8=2^3$ of array elements is selected as a preferred embodiment, each omnidirectional subarray unit including 3 (p=3) symmetric oscillators.

The present invention is applicable to the omnidirectional array antenna beamforming method for the foregoing omnidirectional subarray units, various omnidirectional subarray units being stimulated by means of equiamplitude ($I_n=1$; n=1, 2, 3, . . . , N), and in-phase or out-phase stimulation, thereby forming different types of beams.

Referring to FIGS. 5-14, in this embodiment, the different types of beams include eight types of beams in total, such as a single omnidirectional beam #1, a single directional beam #2, a directional narrow double-beam #3, a directional wide double-beam #4, a non-collinear directional double-beam #5, a directional unequal-width double-beam #6, a directional triple-beam #7, and a directional quadruple-beam #8.

A forming algorithm of the single omnidirectional beam #1 is stimulating various omnidirectional subarray units by means of equiamplitude, and a phase satisfies the following: four odd-numbered array elements are in phase, that is, $\beta_1=\beta_3=\beta_5=\beta_7$; four even-numbered array elements are in phase, that is, $\beta_2=\beta_4=\beta_6=\beta_8$; and the two sets of phases respectively satisfy relations: $\beta_1=\beta_2+\Delta\beta$, $\Delta\beta \in [0,\pi/2]$.

A forming algorithm of the single directional beam #2 is stimulating various omnidirectional subarray units by means of equiamplitude, and a phase satisfies the following:

$$\beta_n = \pm 2 \cdot i \cdot \pi - k \cdot R \cdot \sin\theta_m \cdot \cos\left(\varphi_m - \frac{2n\pi}{N}\right) \quad (1)$$

in the relation (1), i is an integer, n=1, 2, 3, . . . , 8; $k=2\pi/\lambda$, is a number of waves in the air, and $\theta_m$ and $\varphi_m$ are respectively elevation angles $\theta_m$ and an azimuth angle $\varphi_m$. In a horizontal plane, $\theta_m=90°$, i=−1, $R=\lambda/2$ is substituted, and then a relation (2) is simplified as:

$$\beta_n = \left[2 - \cos\left(\varphi_m - \frac{2n\pi}{N}\right)\right] \cdot \pi \quad (2)$$

A forming algorithm of a directional double narrow beam #3 is stimulating various omnidirectional subarray units by means of equiamplitude, and a phase satisfies the following relations: $\beta_1=\beta_4=(1/1.75+2 \cdot q) \cdot \pi$, $\beta_2=\beta_3=2 \cdot q \cdot \pi$, $\beta_5=\beta_8=[(1+1/1.75)+2 \cdot q] \cdot \pi$, and $\beta_6=\beta_7=(1+2 \cdot q) \cdot \pi$, where q is an integer.

A forming algorithm of the directional wide double-beam #4 is stimulating various array elements by means of equiamplitude, and a phase satisfies the following relations: $\beta_1=\beta_2\beta_3\beta_4=2 \cdot q \cdot \pi$; $\beta_5=\beta_6=\beta_7=\beta_8=(1+2 \cdot q) \cdot \pi$, where q is an integer.

A forming algorithm of the directional unequal-width double-beam #5 is stimulating various array elements by means of equiamplitude, and a phase satisfies the following relations: $\beta_1=\beta_3=\{[1-\cos(\pi/4)]+2 \cdot q\} \cdot \pi$, $\beta_2=2 \cdot q \cdot \pi$, $\beta_4=\beta_8=\pi$, $\beta_5=\beta_7=[(1-1/4)+2 \cdot q] \cdot \pi$, and $\beta_6=[(1-1/6)+2 \cdot q] \cdot \pi$, where q is an integer.

A forming algorithm of the non-collinear directional double-beam #6 is stimulating various array elements by means of equiamplitude, and a phase satisfies the following relations: $\beta_1=\beta_3=(1/1.75+2 \cdot q) \cdot \pi$, $\beta_2=2 \cdot q \cdot \pi$, $\beta_4=(1/1.75+1/2+2 \cdot q) \cdot \pi$, $\beta_5=[(1+1/1.75+1/2)+2 \cdot q] \cdot \pi$, $\beta_7=\pi$, and $\beta_6=\beta_8=[(1+1/1.75)+2 \cdot q] \cdot \pi$, where q is an integer.

A forming algorithm of the directional triple-beam #7 is stimulating various array elements by means of equiamplitude, and a phase satisfies the following relations: $\beta_1=\beta_3=\{[1-\cos(\pi/4)]+2 \cdot q\} \cdot \pi$, $\beta_2=2 \cdot q \cdot \pi$, $\beta_4=\beta_8=(1+2 \cdot q) \cdot \pi$, $\beta_5=[(1+1/3.5)+2 \cdot q] \cdot \pi$, $\beta_6=[(1+1/2.875)+2 \cdot q] \cdot \pi$, and $\beta_7=[(1-1/3.5)+2 \cdot q] \cdot \pi$, where q is an integer.

A forming algorithm of the directional quadruple-beam #8 is stimulating various array elements by means of equiamplitude, and a phase satisfies the following relations: $\beta_1=\beta_4=\beta_5=_8=2 \cdot q \cdot \pi$; $\beta_2=\beta_3=\beta_6=\beta_7=(1+2 \cdot q) \cdot \pi$, where q is an integer.

According to the omnidirectional array antenna beamforming method proposed in the present invention, 8 (N=8) array elements are used, and the array elements being composed of 3 (p=3) meta-symmetric oscillator subarrays, and the following beamforming algorithms are uniquely used to realize eight typical business beams: (1) an omnidirectional beam formed through stimulation by means of equiamplitude and in-phase stimulation, to cover a horizontal periphery; (2) a horizontally directional beam formed through stimulation by means of equiamplitude and out-phase stimulation, to point to an azimuth angle; (3) a horizontally directional narrow double-beam formed through stimulation by means of equiamplitude and out-phase stimulation, the two beams being collinear and having equal widths; (4) a horizontally directional wide double-beam formed through stimulation by means of equiamplitude and out-phase stimulation, the two beams being collinear and having equal widths; (5) a horizontally directional unequal-width double-beam formed through stimulation by means of equiamplitude and out-phase stimulation, the two beams being collinear and having unequal widths; (6) a horizontally directional narrow double-beam formed through stimulation by means of equiamplitude and out-phase stimulation, the two beams having equal widths and being not collinear; (7) a horizontally directional triple-beam formed through stimulation by means of equiamplitude and out-phase stimulation, the three beams having unequal widths and unequal included angles; (8) a horizontally directional narrow quadruple-beam formed through stimulation by means of equiamplitude and out-phase stimulation, the four beams having equal widths and equal included angles. The foregoing eight beams are the most typical and most useful types in future 5G applications. Implementation of multiple MIMO beamforming capabilities means that the omnidirectional array exhibits great potential in 5G applications.

Figure 7:
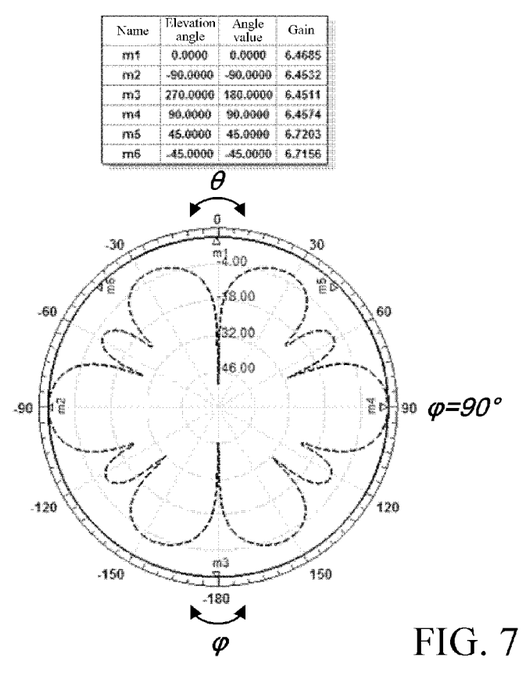
FIG. 7 is a 2D directional diagram of a single formed omnidirectional beam #1 of an omnidirectional array antenna according to the present invention at $f_c$=3.5 GHz.

For the beamforming implementation effect of the omnidirectional array antenna in the present invention, reference may be made to Table I below, a specific algorithm instance table for the beamforming implementation of the omnidirectional array antenna, FIGS. 7-14, and 2D directional diagrams of various beams at $f_c$=3.5 GHz.

out-of-roundness of the H-plane is less than 0.24 dB, a gain G=6.47 dBi, and a radiation feature is almost the same as that of a subarray unit.

Figure 8:
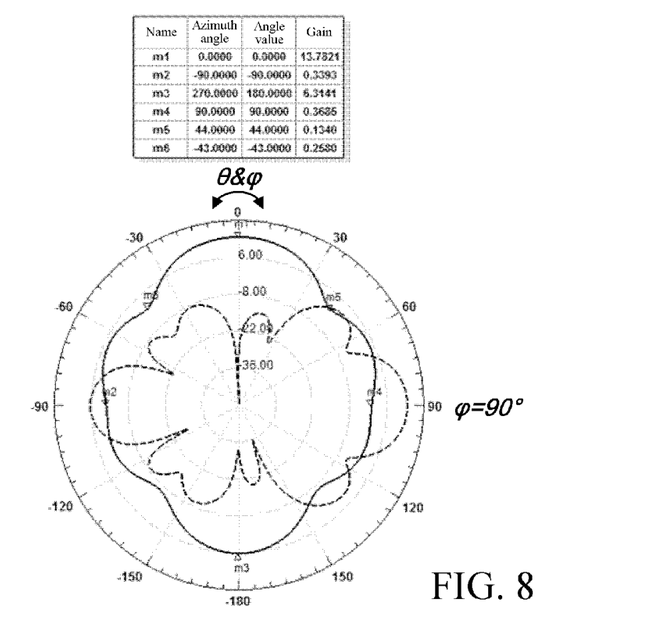
FIG. 8 is a 2D directional diagram of a single formed omnidirectional beam #2 of an omnidirectional array antenna according to the present invention at $f_c$=3.5 GHz.

FIG. 8 is a 2D directional diagram of a formed single omnidirectional beam #2 of an omnidirectional array antenna according to the present invention at $f_c$=3.5 GHz. A solid line represents an H-plane (Theta=90°, XOY plane), and a dashed line represents an E-plane (Phi=0°, YOZ plane). A main lobe points to a direction of an azimuth angle φ=0°, a beam width in the E/H plane is respectively: HPBW=23.92° and 40.67°, and a gain G=13.78 dBi. A sidelobe level (SLL) is lower than that of the main lobe by about 13.78 dB, and a front-to-back ratio (FTBR) is 7.5 dB.

TABLE I

Beamforming Algorithms of the Omnidirectional Array Antenna

Figure 9:
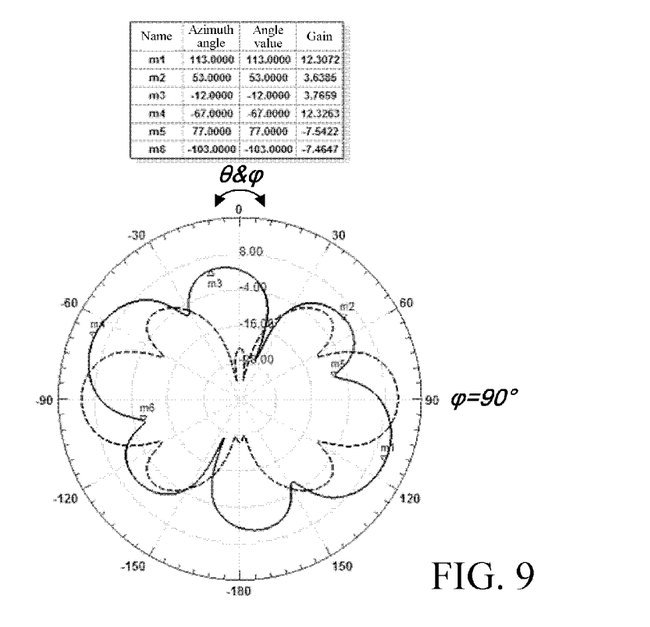
FIG. 9 is a 2D directional diagram of a formed directional narrow double-beam #3 of an omnidirectional array antenna according to the present invention at $f_c$=3.5 GHz.
Figure 10:
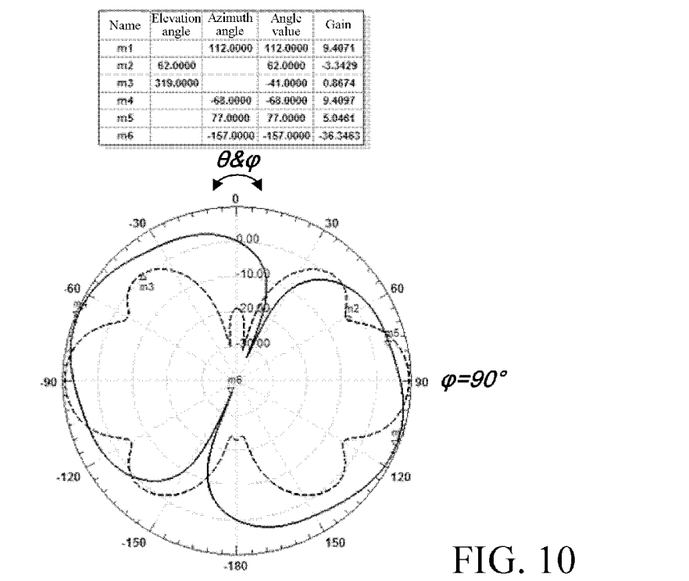
FIG. 10 is a 2D directional diagram of a formed directional wide double-beam #4 of an omnidirectional array antenna according to the present invention at $f_c$=3.5 GHz.
Figure 11:
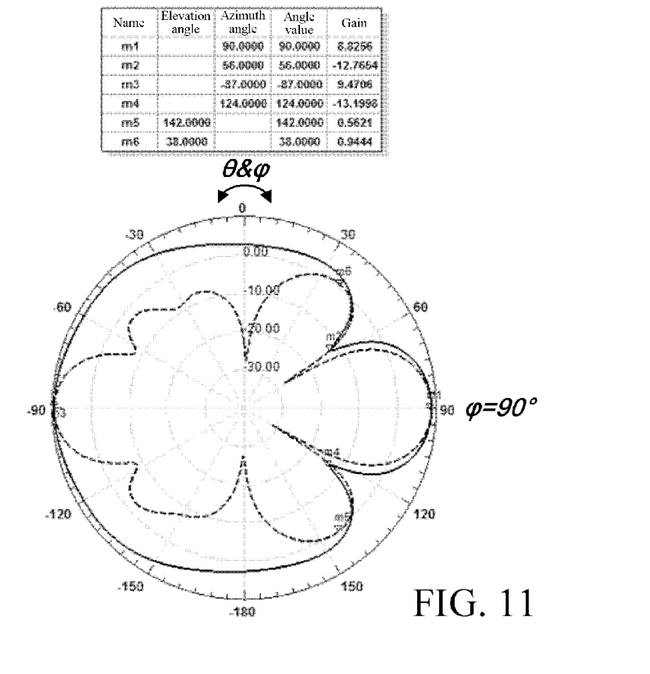
FIG. 11 is a 2D directional diagram of a formed directional unequal-width double-beam #6 of an omnidirectional array antenna according to the present invention at $f_c$=3.5 GHz.
Figure 12:
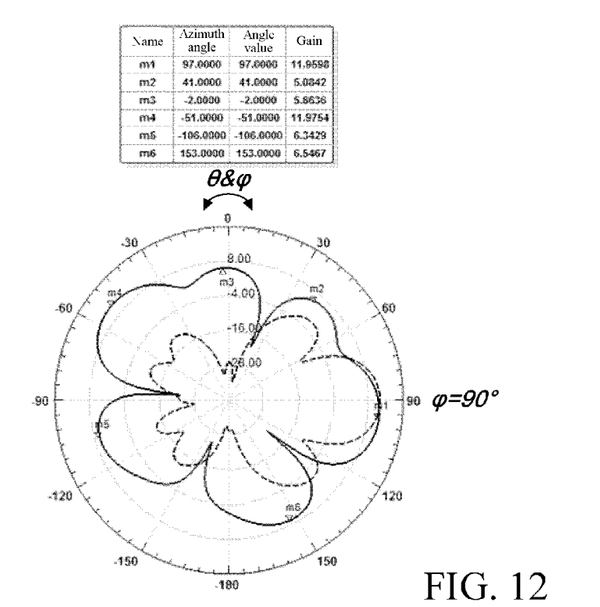
FIG. 12 is a 2D directional diagram of a formed non-collinear directional double-beam #5 of an omnidirectional array antenna according to the present invention at $f_c$=3.5 GHz.
Figure 13:
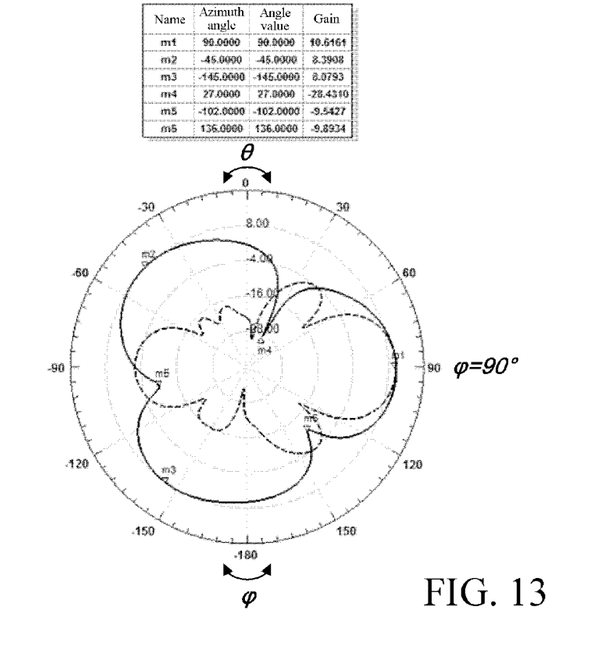
FIG. 13 is a 2D directional diagram of a formed directional triple-beam #7 of an omnidirectional array antenna according to the present invention at $f_c$=3.5 GHz.
Figure 14:
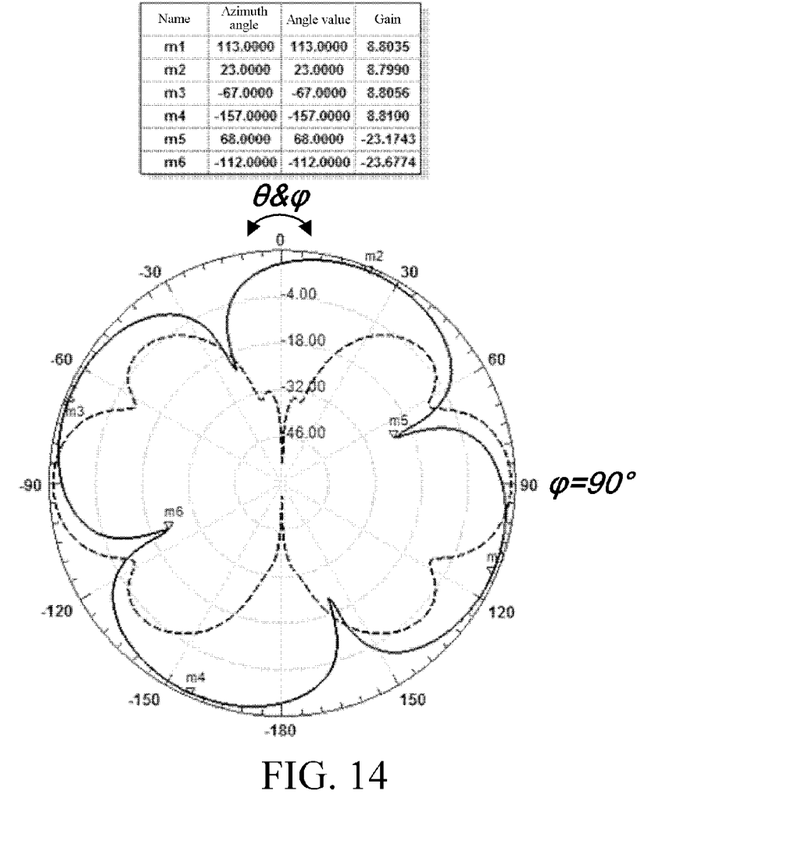
FIG. 14 is a 2D directional diagram of a formed directional quadruple-beam #7 of an omnidirectional array antenna according to the present invention at $f_c$=3.5 GHz.

| Beam type\Array element number | | UC#1 UC#2 UC#3 UC#4 UC#5 UC#6 UC#7 UC#8 |
|---|---|---|
| Single omnidirectional beam #1, as shown in FIG. 7 | Amplitude $I_n$(A) | $I_n = 1, (n = 1, 2, 3, \ldots, 8)$ |
| | Phase $\beta_n$ (rad) | $\beta_1 = \beta_3 = \beta_5 = \beta_7, \beta_2 = \beta_4 = \beta_6 = \beta_8; \beta_1 = \beta_2 + \Delta\beta, \Delta\beta \in [0, \pi/2]$ |
| Single directional beam #2, as shown in FIG. 8 | Amplitude $I_n$(A) | $I_n = 1, (n = 1, 2, 3, \ldots, 8)$ |
| | Phase $\beta_n$ (rad) | $\beta_n = \left[2 - \cos\left(\varphi - \frac{2n\pi}{8}\right)\right] \cdot \pi; n = 1, 2, 3, \ldots, 8;$ |
| Directional narrow double-beam #3, as shown in FIG. 9 | Amplitude $I_n$(A) | $I_n = 1, (n = 1, 2, 3, \ldots, 8)$ |
| | Phase $\beta_n$ (rad) | $\beta_1 = \beta_4 = (1/1.75 + 2 \cdot q) \cdot \pi, \beta_2 = \beta_3 = 2 \cdot q \cdot \pi, \beta_5 = \beta_8 = [(1 + 1/1.75) + 2 \cdot q] \cdot \pi, \beta_6 = \beta_7 = (1 + 2 \cdot q) \cdot \pi;$ (q is an integer) |
| Directional wide double-beam #4, as shown in FIG. 10 | Amplitude $I_n$(A) | $I_n = 1, (n = 1, 2, 3, \ldots, 8)$ |
| | Phase $\beta_n$ (rad) | $\beta_1 = \beta_2 = \beta_3 = \beta_4 = 2 \cdot q \cdot \pi; \beta_5 = \beta_6 = \beta_7 = \beta_8 == (1 + 2 \cdot q) \cdot \pi$ (q is an integer) |
| Directional unequal-width double-beam #5, as shown in FIG. 11 | Amplitude $I_n$(A) | $I_n = 1, (n = 1, 2, 3, \ldots, 8)$ |
| | Phase $\beta_n$ (rad) | $\beta_1 = \beta_3 = \{[1 - \cos(\pi/4)] + 2 \cdot q\} \cdot \pi, \beta_2 = 2 \cdot q \cdot \pi, \beta_4 = \beta_8 = \pi,$ $\beta_5 = \beta_7 = [(1 - 1/4) + 2 \cdot q] \cdot \pi; \beta_6 = [(1 - 1/6) + 2 \cdot q] \cdot \pi$ (q is an integer) |
| Non-collinear directional double-beam #6, as shown in FIG. 12 | Amplitude $I_n$(A) | $I_n = 1, (n = 1, 2, 3, \ldots, 8)$ |
| | Phase $\beta_n$ (rad) | $\beta_1 = \beta_3 = (1/1.75 + 2 \cdot q) \cdot \pi, \beta_2 = 2 \cdot q \cdot \pi, \beta_4 = (1/1.75 + 1/2 + 2 \cdot q) \cdot \pi,$ $\beta_5 = [(1 + 1/1.75 + 1/2) + 2 \cdot q] \cdot \pi, \beta_7 = \pi, \beta_6 = \beta_8 = [(1 + 1/1.75) + 2 \cdot q] \cdot \pi;$ (q is an integer) |
| Directional triple-beam #7, as shown in FIG. 13 | Amplitude (A) | $I_n = 1, (n = 1, 2, 3, \ldots, 8)$ |
| | Phase $\beta_n$ (rad) | $\beta_1 = \beta_3 = \{[1 - \cos(\pi/4)] + 2 \cdot q\} \cdot \pi, \beta_2 = 2 \cdot q \cdot \pi, \beta_4 = \beta_8 = (1 + 2 \cdot q) \cdot \pi,$ $\beta_5 = [(1 + 1/3.5 + 2 \cdot q) \cdot \pi,$ $\beta_6 = [(1 + 1/2.875) + 2 \cdot q)] \cdot \pi, \beta_7 = [(1 - 1/3.5) + 2 \cdot q] \cdot \pi;$ (q is an integer) |
| Directional quadruple-beam #8, as shown in FIG. 14 | Amplitude $I_n$(A) | $I_n = 1, (n = 1, 2, 3, \ldots, 8)$ |
| | Phase $\beta_n$ (rad) | $\beta_1 = \beta_4 = \beta_5 = \beta_8 = 2 \cdot q \cdot \pi, \beta_2 = \beta_3 = \beta_6 = \beta_7 = (1 + 2 \cdot q) \cdot \pi$ (q is an integer) |

Figure 5:
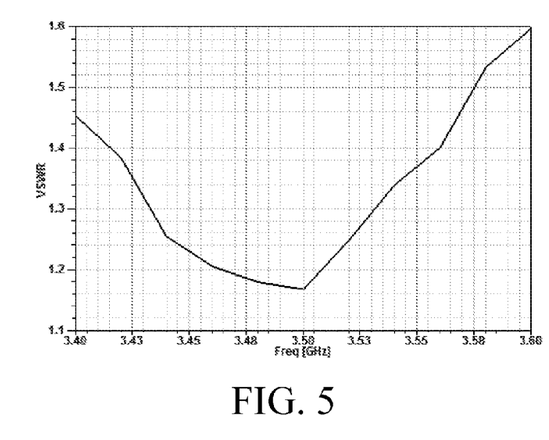
FIG. 5 shows a VSWR curve of a standing wave of an omnidirectional subarray unit according to the present invention.

FIG. 5 shows a VSWR curve of a standing wave of an omnidirectional subarray unit according to the present invention. It can be seen from the figure that within a frequency band of 3.4-3.6 GHz, the VSWR of the standing wave of the subarray unit ≤1.60, with good impedance matching.

Figure 6:
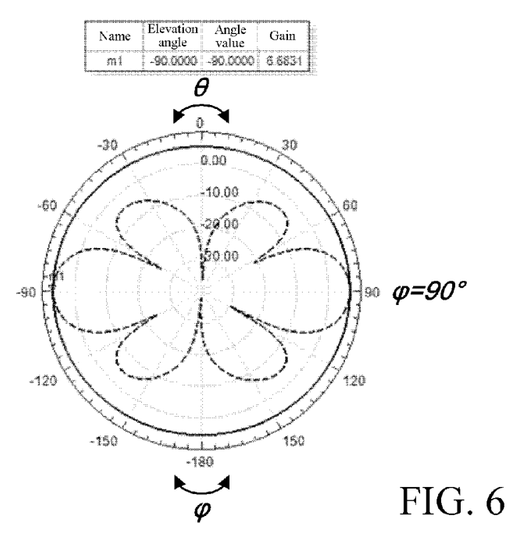
FIG. 6 is a 2D directional diagram of an omnidirectional subarray unit according to the present invention at a central frequency point $f_c$=3.5 GHz.

FIG. 6 is a 2D directional diagram of an omnidirectional subarray unit according to the present invention at a central frequency point $f_c$=3.5 GHz. A solid line represents an H-plane (Theta=90°, XOY plane), and a dashed line represents an E-plane (Phi=90°, YOZ plane). A beam width in the E-plane is HPBW=24.73°, ideal omnidirectional radiation (out-of-roundness being less than 0.24 dB) is conducted on the H-plane, and a gain G=6.68 dBi.

FIG. 7 is a 2D directional diagram of a formed single omnidirectional beam #1 of an omnidirectional array antenna according to the present invention at $f_c$=3.5 GHz. A solid line represents an H-plane (Theta=90°, XOY plane), and a dashed line represents an E-plane (Phi=90°, YOZ plane). A beam width in the E-plane is HPBW=20.37°, FIG. 9 is a 2D directional diagram of a formed directional narrow double-beam #3 of an omnidirectional array antenna according to the present invention at $f_c$=3.5 GHz. A solid line represents an H-plane (Theta=90°, XOY plane), and a dashed line represents an E-plane (Phi=113°, YOZ plane). A main lobe points to a direction of azimuth angles φ=113° and 293°, and an angle between the two main lobes is 180°. A beam width in the E/H plane is respectively: HPBW=25.18° and 32.68°, and a gain G=12.33 dBi. A sidelobe level (SLL) is lower than that of the main lobe by about 9 dB, and a deep zero point is formed in a direction orthogonal to a main beam.

FIG. 10 is a 2D directional diagram of a formed directional wide double-beam #4 of an omnidirectional array antenna according to the present invention at $f_c$=3.5 GHz. A solid line represents an H-plane (Theta=90°, XOY plane), and a dashed line represents an E-plane (Phi=112°, YOZ plane). A main lobe points to a direction of azimuth angles φ=112° and 292°, and an angle between the two main lobes is 180°. A beam width in the E/H plane is respectively:

HPBW=28.85° and 50.18°, and a gain G=9.41 dBi, and a deep zero point is formed in a direction orthogonal to a main beam.

FIG. 11 is a 2D directional diagram of a formed directional unequal-width double-beam #6 of an omnidirectional array antenna according to the present invention at $f_c$=3.5 GHz. A solid line represents an H-plane (Theta=90°, XOY plane), and a dashed line represents an E-plane (Phi=90°, YOZ plane). A main lobe points to a direction of azimuth angles φ=90° and 270°, and an angle between the two main lobes is 180°. A beam width in the E/H plane is respectively: HPBW=24.50° and 117.0°, (a wide beam)/31.20° (a narrow beam), a gain G=9.47 dBi, so that a deep zero point is formed at a location at which a main beam intersects a sub-beam.

FIG. 12 is a 2D directional diagram of a formed non-collinear directional double-beam #5 of an omnidirectional array antenna according to the present invention at $f_c$=3.5 GHz. A solid line represents an H-plane (Theta=90°, XOY plane), and a dashed line represents an E-plane (Phi=97°, YOZ plane). A main lobe points to a direction of azimuth angles φ=97° and 309°, and an angle between the two main lobes is 148° (a sharp angle) or 212° (an obtuse angle). A beam width in the E/H plane is respectively: HPBW=24.60° and 31.20°, and a gain G=11.96 dBi. Ipsilateral and lateral sidelobe levels (SLL) are respectively lower than that of the main lobe level by about 7 dB and 5.5 dB, and deep zero points are formed in a direction orthogonal to a main beam and at a location at which the lateral sidelobe intersects the main lobe.

FIG. 13 is a 2D directional diagram of a formed directional triple-beam #7 of an omnidirectional array antenna according to the present invention at $f_c$=3.5 GHz. A solid line represents an H-plane (Theta=90°, XOY plane), and a dashed line represents an E-plane (Phi=90°, YOZ plane). Three main lobes point to directions of azimuth angles φ=90°, 215°, and 315°, and angles between two adjacent main lobes are respectively 143°, 135° and 100°. A beam width in the E/H plane is respectively: HPBW=24.5°, 65°/50°/46°, and a gain G=10.73 dBi. Relatively deeper zero points are formed at a location three beams intersect.

FIG. 14 is a 2D directional diagram of a formed directional quadruple-beam #7 of an omnidirectional array antenna according to the present invention at $f_c$=3.5 GHz. A solid line represents an H-plane (Theta=90°, XOY plane), and a dashed line represents an E-plane (Phi=23°/113°, YOZ plane). Four main lobes respectively point to directions of azimuth angles φ=23°, 113°, 203°, and 293°, and an angle between two adjacent main lobes is 90°. A beam width in the E/H plane is respectively: HPBW=25.13°, 47.24°, and a gain G=8.81 dBi. Deep zero points are formed at a location four beams intersect.

The above descriptions are merely preferred embodiments of the present invention, but not intended to limit or restrict the present invention. A researched or technician skilled in the art may make various modifications and changes to the present invention. Any modification, equivalent replacement, or improvement made without departing from the spirit and principle of the present invention should fall within the protection scope stated in the present invention.

What is claimed is:
1. An omnidirectional array antenna, comprising:
N omnidirectional subarray units that are circumferentially arranged to form a circular array, a diameter of the circular array being an integral multiple of a central wavelength $\lambda_c$, and
each of the omnidirectional subarray units comprising p coaxially-arrayed symmetrical oscillators,
wherein N and p are both natural numbers.
2. The omnidirectional array antenna according to claim 1, wherein the coaxially-arrayed symmetrical oscillators of the omnidirectional subarray units are half-wave oscillators.
3. The omnidirectional array antenna according to claim 2, wherein the symmetric oscillators of the omnidirectional subarray units are coaxially arrayed into a vertically polarized subarray or coplanarly arrayed into a horizontally polarized subarray.
4. The omnidirectional array antenna according to claim 1, wherein the N omnidirectional subarray units are vertically arranged at equal intervals at circumferential azimuth angle $\varphi_n = 2 \cdot n \cdot \pi / N$, wherein n=1, 2, 3, . . . , N.
5. The omnidirectional array antenna according to claim 1, wherein the symmetric oscillators of the omnidirectional subarray units are printed on a PCB dielectric plate, the dielectric plate being perpendicular to a diameter of the circular array.
6. The omnidirectional array antenna according to claim 1, wherein the symmetrical oscillators of the omnidirectional subarray units are constructed in a form of a metal tube.
7. The omnidirectional array antenna according to claim 1, wherein the omnidirectional subarray units have different types of beams, comprising at least one of a single omnidirectional beam, a single directional beam, a directional narrow double-beam, a directional wide double-beam, a non-collinear directional double-beam, a directional unequal-width double-beam, a directional triple-beam, and a directional quadruple-beam.
8. An omnidirectional array antenna beamforming method, applied to the omnidirectional array antenna according to claim 1, comprising:
forming different types of beams by stimulating various omnidirectional subarray units by equiamplitude, in-phase or out-phase stimulation.
9. The omnidirectional array antenna beamforming method according to claim 8, wherein the different types of beams comprise at least one of a single omnidirectional beam, a single directional beam, a directional narrow double-beam, a directional wide double-beam, a non-collinear directional double-beam, a directional unequal-width double-beam, a directional triple-beam, and a directional quadruple-beam.
10. The omnidirectional array antenna beamforming method according to claim 9, wherein the omnidirectional array antenna comprises eight omnidirectional subarray units, a forming algorithm of the single omnidirectional beam being stimulating various omnidirectional subarray units by means of equiamplitude, a phase satisfying the following: four odd-numbered array elements being of a same phase, that is, $\beta_1=\beta_3=\beta_5=\beta_7$; four even-numbered array elements being of a same phase, that is, $\beta_2=\beta_4=\beta_6=\beta_8$; and the two sets of phases respectively satisfying relations: $\beta_1=\beta_2+\Delta\beta$ and $\Delta\beta \in [0,\pi/2]$.
11. The omnidirectional array antenna beamforming method according to claim 9, wherein the omnidirectional array antenna comprises eight omnidirectional subarray units, a forming algorithm of the single directional beam being stimulating various omnidirectional subarray units by means of equiamplitude, and a phase satisfying the following:

$$\beta_n = \pm 2 \cdot i \cdot \pi - k \cdot R \cdot \sin\theta_m \cdot \cos\left(\varphi_m - \frac{2n\pi}{N}\right)$$

in the relation, i and N are integers, n=1, 2, 3 ..., N; k=$2\pi/\lambda$ is a number of waves in the air, and $\theta_m$ and $\varphi_m$ are respectively an elevation angle $\theta_m$ and an azimuth angle $\varphi_m$ pointed by a maximum beam.

12. The omnidirectional array antenna beamforming method according to claim 9, wherein the omnidirectional array antenna comprises eight omnidirectional subarray units, a forming algorithm of the directional narrow double-beam being stimulating various omnidirectional subarray units by means of equiamplitude, a phase satisfying the following:
$\beta_1=\beta_4=(1/1.75+2\cdot q)\cdot\pi$, $\beta_2=\beta_3=2\cdot q\cdot\pi$, $\beta_5=\beta_8=[(1/1.75)+2\cdot q]\cdot\pi$, and $\beta_6=\beta_7=(1+2\cdot q)\cdot\pi$, wherein q is an integer.

13. The omnidirectional array antenna beamforming method according to claim 9, wherein the omnidirectional array antenna comprises eight omnidirectional subarray units, a forming algorithm of the directional wide double-beam being stimulating various array elements by means of equiamplitude, and a phase satisfying the following:
$\beta_1=\beta_2=\beta_3=\beta_4=2\cdot q\cdot\pi$; $\beta_5=\beta_6=\beta_7=\beta_8=(1+2\cdot q)\cdot\pi$, wherein q is an integer.

14. The omnidirectional array antenna beamforming method according to claim 9, wherein the omnidirectional array antenna comprises eight omnidirectional subarray units, a forming algorithm of the directional unequal-width double-beam being stimulating various array elements by means of equiamplitude, the phase satisfying the following:
$\beta_1=\beta_3=\{[1-\cos(\pi/4)]+2\cdot q\}\cdot\pi$, $\beta_2=2\cdot q\cdot\pi$, $\beta_4=\beta_8=\pi$, $\beta_5=\beta_7=[(1-1/4)+2\cdot q]\cdot\pi$, and $\beta_6=[(1-1/6)+2\cdot q]\cdot\pi$, wherein q is an integer.

15. The omnidirectional array antenna beamforming method according to claim 9, wherein the omnidirectional array antenna comprises eight omnidirectional subarray units, a forming algorithm of the non-collinear directional double-beam being stimulating various array elements by means of equiamplitude, a phase satisfying the following:
$\beta_1=\beta_3=(1/1.75+2\cdot q)\cdot\pi$, $\beta_2=2\cdot q\cdot\pi$, $\beta_4=(1/1.75+1/2+2\cdot q)\cdot\pi$, $\beta_5=[(1+1/1.75+1/2)+2\cdot q]\cdot\pi$, $\beta_7=\pi$, and $\beta_6=\beta_8=[(1+1/1.75)+2\cdot q]\cdot\pi$, wherein q is an integer.

16. The omnidirectional array antenna beamforming method according to claim 9, wherein the omnidirectional array antenna comprises eight omnidirectional subarray units, a forming algorithm of the directional triple-beam being stimulating various array elements by means of equi-amplitude, a phase satisfying the following:
$\beta_1=\beta_3=\{[1-\cos(\pi/4)]+2\cdot q\}\cdot\pi$, $\beta_2=2\cdot q\cdot\pi$, $\beta_4=\beta_8=(1+2\cdot q)\cdot\pi$, $\beta_5=[(1+1/3.5)+2\cdot q]\cdot\pi$, $\beta_6=[(1+1/2.875)+2\cdot q]\cdot\pi$, and $\beta_7=[(1-1/3.5)+2\cdot q]\cdot\pi$, wherein q is an integer.

17. The omnidirectional array antenna beamforming method according to claim 9, wherein the omnidirectional array antenna comprises eight omnidirectional subarray units, a forming algorithm of the directional quadruple-beam being stimulating various array elements, a phase satisfying the following: $\beta_1=\beta_4=\beta_5=\beta_8=2\cdot q\cdot\pi$ and $\beta_2=\beta_3=\beta_6=\beta_7=(1+2\cdot q)\cdot\pi$, wherein q is an integer.

* * * * *